United States Patent [19]

Patrin

[11] 4,272,094
[45] Jun. 9, 1981

[54] POWERCYCLE

[76] Inventor: Raymond A. Patrin, 34-32 75th St., Queens New York, N.Y. 11372

[21] Appl. No.: 48,419

[22] Filed: Jun. 14, 1979

[51] Int. Cl.³ .............................................. B62M 1/10
[52] U.S. Cl. ................................................. 280/217
[58] Field of Search ............... 280/217, 215; 180/165; 74/572

[56] References Cited
FOREIGN PATENT DOCUMENTS

| | | | |
|---|---|---|---|
| 118949 | 9/1944 | Australia | 280/217 |
| 2618 | 9/1918 | Netherlands | 280/217 |
| 1896 | of 1897 | United Kingdom | 280/217 |
| Ad. 10954 1910 | of 1911 | United Kingdom | 280/217 |
| Ad. 7972 | | | |

*Primary Examiner*—John A. Pekar
*Attorney, Agent, or Firm*—Martin A. Farber

[57] ABSTRACT

The powercycle comprises a powerwheel adjacent to or between the radially supporting spokes or sides of the wheel of a bicycle, motorcycle or other transportation medium. The powerwheel comprises a flywheel and a mechanical assembly housed in its hollow center which is engageable with the stationary axle gear and with the flywheel through clutch devices.

15 Claims, 10 Drawing Figures

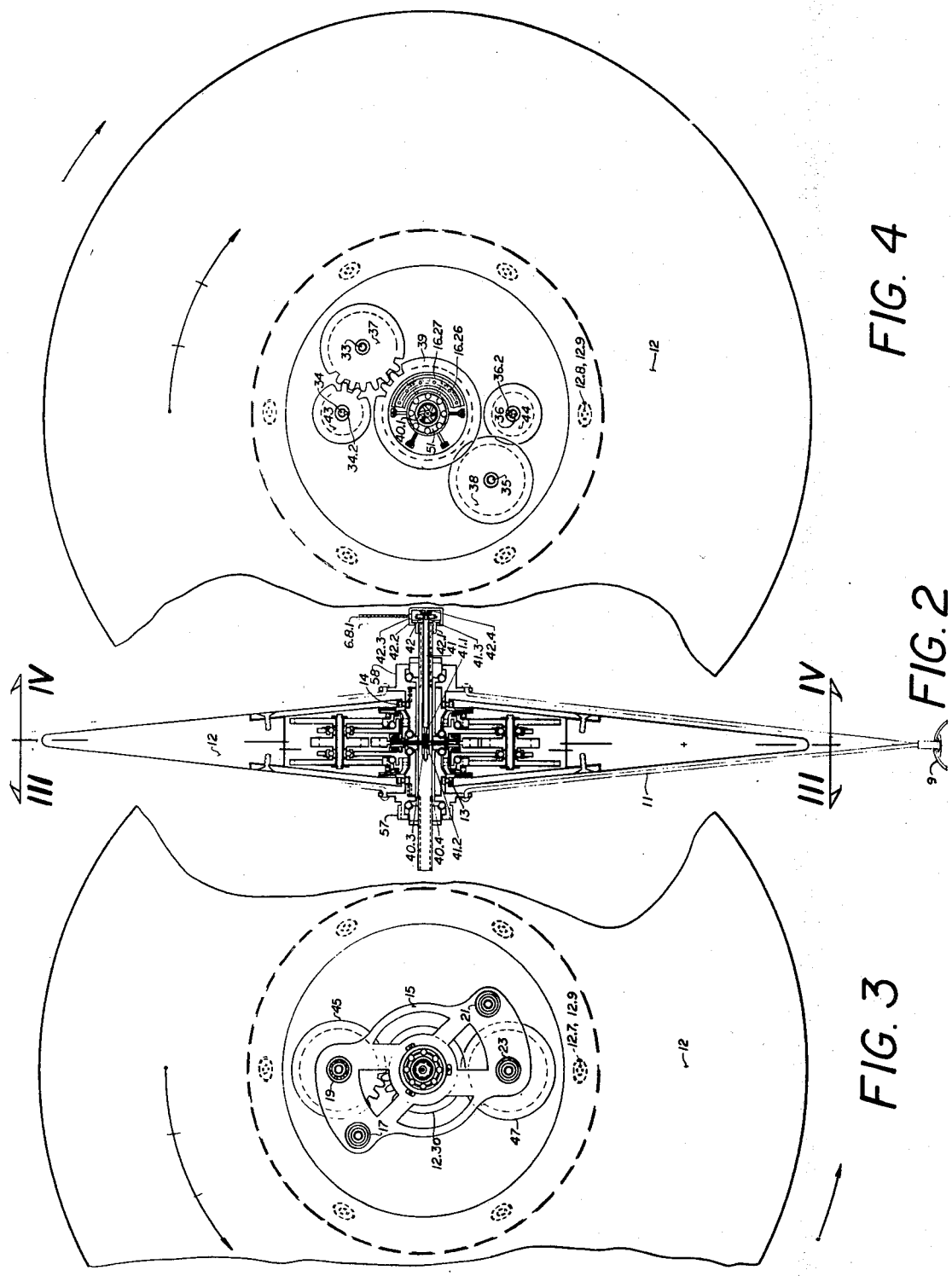

// POWERCYCLE

The invention herein was the subject matter of Disclosure Document No. 076408, entitled Powercycle filed in the U.S. Patent & Trademark Office on Dec. 12, 1978.

BACKGROUND OF THE INVENTION

1. Field of the Invention

The present invention relates to a vehicle wheel with an additional flywheel and associated structure.

2. Description of the Prior Art

Flywheels have been known per se in various uses with vehicles. U.S. Pat. No. 1,599,117 (Conlon) relates to a bicycle having a flywheel secured non-releasably around the hub. In this case disadvantages arise since one must always bear the burden of the increased weight and mass which is secured to the hub, demanding additional energy during starting and during stopping.

U.S. Pat. No. 2,580,944 (Nemeth) deals with a bicycle with a plurality of weights symmetrically disposed about and supported by the hub of the bicycle wheel, which weights are fixed to the hub yet move radially under centrifugal force while revolving in an orbit about the rotational axis of the wheel. The weights are spring-retracted toward the axis and require lever means as well as a mechanism for moving the relatively heavy weights. This device provides disadvantages as a result of the fixed discrete separate weights and their associated moving mechanisms. Additionally the same basic disadvantage occurs as with the previously mentioned known device requiring extra energy at all times, even though the extra energy requirement may be reduced at particular times by radially moving the weights.

U.S. Pat. No. 4,116,088 (Giovachini) discloses a composite wheel structure having a flywheel mass non-releasably connected to the wheel and provided with a mechanism to vary the distance of the mass as the rotational speed of the wheel increases, the wheel comprising at least two elements made of materials having different yield strengths, one being peripheral and the other connecting the peripheral element to the wheel hub, the latter including two conical flanges having concave sides thereof facing each other. A mechanism varies the angle formed between the flanges in order to provide either a limitation of the stresses exerted on the material forming the flanges or an accompanying of the expansion of the peripheral material by the flanges, increasing or decreasing the wheel diameter. This device also has the disadvantages mentioned above and is not suitable for the purposes of the present invention.

Also prior art shows the application of flywheels outside of the immediate confines of the wheel structure operating through chains or other connecting links, which with respect to the present invention are deemed irrelevant.

It is an object of the present invention to provide a wheel having a flywheel which is radially immovable providing operating and installation advantages and not having the disadvantages of the prior devices.

SUMMARY OF THE INVENTION

A powercycle comprises a powerwheel adjacent to or between the radially supporting spokes or sides of the wheel of a bicycle, motorcycle or other transportation medium. The powerwheel comprises a flywheel and a mechanical assembly housed in its hollow center which is selectively engageable and disengageable with the stationary axle gear and with the flywheel through clutch devices. Powercycle is a term coined and used herein by the present inventor.

The powerwheel gyrates on the powercycle hubs in the same direction as the powercycle, at RPM several times faster than the rotation of the hub and tire. It exerts an added impetus on the moving powercycle, principally based on the force generated by the torsional velocity and mass of the powerwheel. Accordingly, the powerwheel gyration of a powercycle offers ride stability, greater uniformity in travel speed and economizes effort in pedalling, or in fuel or other energy due to its operative motion. This powerwheel can be used in a variety of similar applications with appropriate modifications to that indicated herein, whether wheeled, propelled or otherwise, all included within the scope of this invention.

The powerwheel can be made from metallic or other materials, and comprises a concentrically balanced flywheel, housing in its hollow center the mechanism which drives it.

A hand-actuated clutch may be provided with the device used on a bicycle. By selectively disengaging the clutch(es) the operator will ride as on a conventional bicycle. That is, the powerwheel(s) will not engage with the powercycle and the added momentum will not contribute to the forward motion of the vehicle.

By selectively engaging the low and high rpm clutches, the powerwheel will add momentum to the powercycle and in doing so, not only will the rider increase power to the vehicle, but depending on the speed of travel, if suddenly the rider desires to stop, the gyration of the powerwheels constitutes potential energy to be used for effecting startup some moments later; the rider also experiences a gyroscopic effect by being supported in the upright equilibrium position even though the two-wheeled vehicle has stopped, that is the rider need not place his feet on the ground to support a two-wheeled bicycle which has just stopped with the flywheel still spinning.

This effect will also be very helpful to beginners learning to ride, and especially to young people who can now discover that falling off a two-wheeled vehicle is not so easy.

When the vehicle is moving and the flywheel is at high rpm, still when the operator brakes, no extra braking power is required, since the clutches will disengage the powerwheel from the hub outer wheel.

Furthermore with a freely rotating powerwheel during the stopped condition of the bicycle, the possibility exists to then engage the clutch so that the momentum of the powerwheel is transferred to the rim of the bicycle to aid starting of the bicycle in its forward drive.

It is of exceptional advantage that the bicycle can be stopped without braking the powerwheel flywheel thereby permitting the powerwheel to continuously retain and store its gyrating energy. That is the powerwheel within the wheel is a tremendous energy saving device due to its gyration and it is extremely beneficial to our contemporary energy problems since the rider can use the inertia of the gyration of the powerwheel even when stopping so that the bicycle remains upright. It can also aid and boost acceleration when it is operatively triggered into connection with the bicycle wheel. It is a tremendous asset to riding a powercycle today.

Also the brakes do not need to stop the powerwheel, since the clutch disengages the powerwheel just before or simultaneously with application of the bicycle brake handle. The bicycle wheel can be stopped without stopping the powerwheel flywheel and can then be braked while keeping the powerwheel-flywheel gyrating and storing energy by the powerwheel gyration.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 2 is a cross-sectional view of the powercycle components;

FIG. 3 is a section taken along the lines III—III of FIG. 2 partially broken away;

FIG. 4 is a section taken along the lines IV—IV of FIG. 2 partially broken away;

FIG. 6b is a section taken along the lines b—b of FIG. 6a;

FIG. 7b is an exploded view of FIG. 7a.

DETAILED DESCRIPTION OF PREFERRED EMBODIMENT

Figure 1:
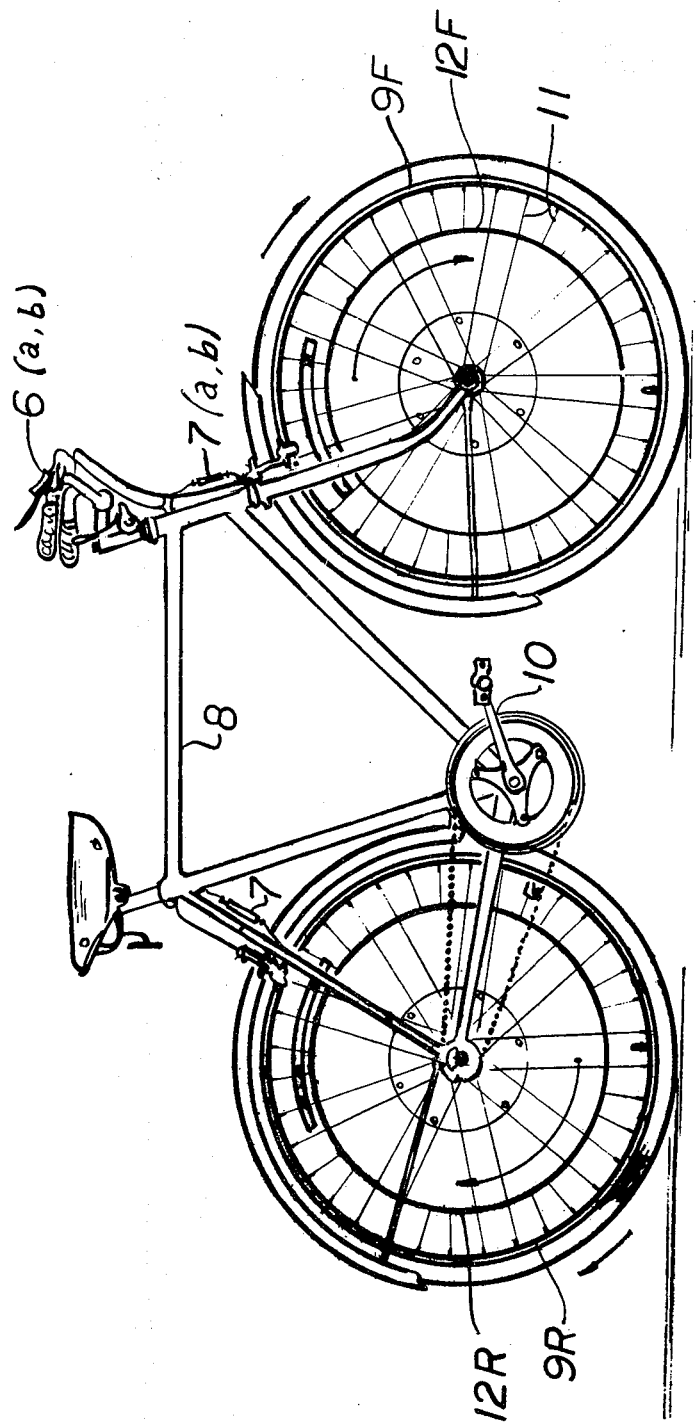
FIG. 1 is a side elevational view showing the powercycle of the present invention as it may function in the form of a bicycle.

Referring now to the drawings, annular powerwheel-flywheel 12 is concentrically balanced and made of a volume and configuration to suit the particular vehicle application. In the illustrated embodiment example the powerwheel-flywheel 12 is rotatably mounted on ball bearings 13, 14, relative to a stationary main axle 40, the latter being connected stationarily and threaded to and for securing the powerwheel and powercycle under the chassis or frame 8 of the bicycle. The powerwheel-flywheel 12 has a cross-sectional shape which radially outwardly narrows up to its outer periphery 12.00 and is centered between the spokes 11 of the bicycle wheel and is spaced from the spokes, either selectively rotatable relative thereto or operatively rotatable because of. The sides of the powerwheel-flywheel are tapered and are parallel and substantially complementary to the spokes' rate of incidence. The inner periphery of the flywheel mass forms an inner diameter cylindrical surface 12.0 defining therein a void space within the confines of the sides in which the driving and gearing mechanism (clutch means) is assembled for selectively operatively connecting and disconnecting, respectively, the powerwheel-flywheel 12 to the outer rim 9 of the wheel with balance. Two powerwheel covers 12.1 and 12.2 are secured by screws 12.9 and 12.10 passing through holes 12.7 and 12.8 each provided with their own recess or countersunk in the covers to receive the screws, to provide a flush or even surface. The powerwheel-flywheel is offset inwardly, forming recesses 12.5 and 12.6 in which the covers are set, and threaded holes 12.11 and 12.12 are provided in which the screws 12.9 and 12.10, respectively, engage to secure the powerwheel 12 and the covers 12.1 and 12.2 in a mutually radial balance when their central bearing race, if bearing balls are used or aperture 12.13 and 12.14, respectively, firmly fit the outer surface of bearings 13, 14, which covers are provided with stop flanges 12.15 and 12.16 covering the side surfaces of the bearing balls or of bearings 13 and 14, respectively, if bearings are used.

A rubber flange adhesive 12.3 and 12.4 around the peripheral edge of the covers conceals the surface of contact within the recesses 12.5 and 12.6, respectively, to seal or minimize sound transmission to and from the powerwheel and to prevent water or liquid penetration into the gearing mechanism.

On the inner sides of the covers adjacent to the central opening there are provided annular, conventional clutch attachments 12.21 and 12.22, respectively (for example friction attachments, however it being noted that various other types of attachments may be used). The clutch attachments 12.21, 12.22 are respectively engageable and disengageable with, and by axial movement of, high rpm clutches 12.23 and 12.24, respectively. The clutches 12.23 and 12.24 are axially displaceable in a direction apart from each other into engagement with and toward each other, out of engagement from the clutch attachments 12.21, 12.22, respectively, as will hereinafter be further described. The high rpm clutches are formed with radially inwardly directed annular clutch races 12.25 and 12.26 and longitudinally extending spaced-apart cylindrical segments constituting high rpm clutch guides 12.27 and 12.28, respectively.

Two powerwheel gear components 12.30 and 12.40 are axially immoveably mounted and rotatably seated on bearing balls 12.32 and 12.42 via gear component races 12.33 and 12.43, respectively. The gear components are provided with peripheral gear teeth (which mesh with peripheral gear teeth of gears 45 and 47 as well as of gears 46 and 48, respectively) and are formed with longitudinally extending spaced cylindrical segmental gear component guides 12.31 and 12.41, respectively, which are formed integrally thereon (similar to the high rpm clutch guides 12.27 and 12.28, respectively) jointly rotatably intermeshing yet axially slidable therebetween snuggly in engagement with the clutch guides 12.27 and 12.28, respectively. Undulating washer-like clutch engaging compression springs 12.35 and 12.45 loop around and between the respective gear component guide and the corresponding high rpm clutch and guide biases, pressing the latter axially in a direction toward engagement with the corresponding clutch attachment 12.21, 12.22.

The bearings 13, 14 constitute bearings for rotatably mounting the powerwheel covers 12.1 and 12.2, respectively, and the powerwheel on hubs 57, 58 relative to the spokes 11 and rim 9 (that is relative to the vehicle wheel), whereas bearing balls 12.32 and 12.42 between bearing races 12.33, 12.43 and 15.5, 15.6 constitute bearings for rotatably mounting the powerwheel gear components 12.30 and 12.40, respectively.

Spoke supporting end hubs 57, 58, in which the spokes (wheel supports) 11 are mounted, are preferably keyed for joint rotation to low rpm clutches 15.22, 16.22, respectively, via keys 15.25, 16.25 and key slots 15.24, 16.24, respectively. The low rpm clutches 15.22, 16.22 are formed with conventional (seats or races 15.23, 16.23) provision for housing conventional bearing balls or bearings 13, 14, respectively, and with keyed round apertures 57.1, 58.1 to firmly fit over the plate hub 15.20, 16.20 (both being referred to as a split hub) using the keys 15.25, 16.25, respectively, via key slots 57.2, 58.2. A conventional free wheel type, single or multi-speed chain sprocket is threaded to the threaded outer end hub 57 which drives hubs 15.20, 16.20 and the rotatably jointly connected low rpm clutches. The powercycle spokes 11 which are connected in a conventional manner to the outer rim 9 of the wheel are connected at their inner ends to the spoke flange 57.11, 58.11 at the end hubs via a plurality of openings 57.10, 58.10, in a per se conventional manner, for joint driving of the spokes and rim jointly together with the end hubs 57, 58, the latter being mounted rotatably via the formed bearings with balls 55, 56 and bearing cones 63, 64, respectively, cut to receive a wrench, and threaded or otherwise secured to the stationary axle 40.

The gear holding plates 15, 16 are formed with a central aperture through which the stationary axle 440 extends. The gear holding plates 15, 16 are formed with bearing races 15.6, 16.6 made by reinforced hard metal to withstand the torsional friction of central bearing balls 15.10 and 16.10 for rotatably mounting the plates 15, 16 relative to the axle. The gear holding plates 15, 16 are also formed with bearing races 15.5, 16.5 for rotatably mounting gear components 12.30, 12.40, respectively, which are likewise formed with bearing races 12.33, 12.43, respectively, and around bearing balls 12.32, 12.42. Other type of bearings may also be used. Herein the central bearing balls 15.10, 16.10 and the two, three part races (elements 51, 52 central stationary races each forming an inner part of each three part race sections 15.21, 16.21 of the split hubs 15.20 and 16.20 hub races each forming an outer part of each three part race; parts 15.6 and 16.6 overlapping parts of each three part race) constitute a central bearing means of the gear holding plates 15, 16 and the split hubs 15.20, 16.20.

The respective gear holding plates 15, 16 are each formed with four openings 15.1, 15.2, 15.3, 15.4 and 16.1, 16.2, 16.3 and 16.4, respectively, in which bearings 17 and 18, respectively, 19 and 20, respectively, 21 and 22, respectively, and 23 and 24, respectively, firmly fit. Pivot rods 33 and 35 penetrate on both ends through bearings 17 and 18, respectively, and 21 and 22, respectively; said bearings are secured inside gear holding plate openings 15.1, 16.1 and 15.3, 16.3, respectively. Pivot rods 34 and 36 on both ends, penetrate through bearings 19 and 20, and through 23 and 24, respectively, thereby secured inside gear holding plate openings 15.2, 16.2 and 15.4, 16.4, respectively. Bearings 17, 18, 19, 20, 21, 22, 23 and 24 are provided with their respective snap rings 17.1, 18.1, 19.1, 20.1, 21.1, 22.1, 23.1, 24.1, respectively. Bowed retainer rings (or washers and screw nuts [not shown]) 25, 26, and 29, 30 engage the grooves 33.1, 35.1 (or threads for screw nuts if used) of the pivot rods 33 and 35, respectively. Similarly numbered bowed retainer rings (or screw nuts) 27, 28 and 31, 32 engage corresponding grooves 34.1 and 36.1 (or threads for screw nuts if used) formed on the ends of the corresponding pivot rods 34, 36.

The gear holding plates 15, 16 are also provided with access openings 15.7, 16.7 between bearing races 15.5, 15.6 and 16.5, 16.6, respectively, through which clutch control links 15.28 and 16.28, respectively, extend. The clutch control links are fastened to the female low rpm clutch 15.11 and 16.11, engaging in link snap slots 15.14 and 16.14, respectively. The link snap slots are formed on flanges 15.13 and 16.13 which are formed on the female low rpm clutches, respectively. These low rpm clutches 15.11 and 16.11 are formed with axially projecting circumferentially spaced guides 15.15 and 16.15 which mesh for relative displaceable axial movement between the gear plate guides 15.9 and 16.9, respectively, through the connected clutch control links. The low rpm clutch control links 15.28, 16.28 in snap slots 15.14 and 16.14 are operatively passing through gear holding plate access openings 15.7 and 16.7 and through the inner race slots of thrust control bearings 15.27, 16.27, respectively.

The female low rpm clutch 15.11 and 16.11 are formed with clutch races 15.12 and 16.12 for the thrust bearing balls 15.26 and 16.26 which in turn engage the clutch races 12.25 and 12.26 of the high rpm clutches 12.23, 12.24, respectively.

Each low rpm clutch constitutes thus two parts, namely a female, low rpm clutch part 15.11 and 16.11 (constituting conical clutch engaging surfaces) and a separated male, low rpm clutch part 15.22 and 16.22 (also constituting the complementary conical clutch engaging surfaces). The male and female portions of the low rpm clutches are axially relatively moveable apart from one another and together for disengagement and engagement via the respective conical clutch engaging surfaces. The male, low rpm clutch surfaces 15.22 and 16.22 are connected with hubs 15.20 and 16.20 having races 15.21 and 16.21 for the bearing balls 15.10, 16.10, respectively at their inner ends. Behind these conical clutch engaging portions 15.22 and 16.22 cylindrical races 15.23, 16.23 for bearings 13, 14 are provided as disclosed above near the outer ends at which key slots 15.24, 16.24, are formed for the attachment of spoke supporting end hubs 57, 58, respectively.

The clutch control links 15.28 and 16.28 respectively extend through the access openings 15.7 and 16.7 in the gear holding plates 15, 16, respectively. Gear plate guides 15.9 and 16.9 are formed on the gear holding plates. The gear plate guides 15.9 and 16.9 comprise axially extending circumferentially spaced segments which mesh complementarily and jointly rotatably engage with the low rpm clutch guides 15.15, 16.15, respectively, yet permitting relative axial displacement of the female low rpm clutch members 15.11, 16.11 relative thereto.

Bearing balls 15.10 and 16.10 in addition to running on the races 15.21, 16.21 of the male low rpm clutch portion also engage central bearing races 51, 52 as well as gear holding plates' races 15.6, 16.6, respectively, around which said gear holding plates 15 and 16 are supported and rotate.

Bearing balls 12.32 and 12.42 disposed between gear holding plate races 15.5, 16.5 and races 12.33, 12.43, respectively, constitute the bearings on which powerwheel gear components 12.30 and 12.40 are supported and rotate. Thrust type clutch control bearings 15.27, 16.27 rest and slide axially on gear holding plate extensions 15.8, 16.8. Each thrust type control bearing having L-section inner and outer races (cf. FIG. 2a) respectively form inner and peripheral recessed slots through which the clutch control links 15.28 and 16.28 extend and are secured thereto, the latter affecting the axial engagement or disengagement of the low and high rpm clutches, when the latter are axially actuated via a clutch wire line 6.8 which is tied onto a clutch disengaging lever 6.14 (hereinafter explained in connection with FIGS. 6a and b, the clutch wire 6.8 being connected to a rotatable rod 41 and operatively extending into clutch control wire lines 6.31, 6.41 operatively connected to the clutch control links through the thrust type control bearings for axially pulling the latter upon actuation of the clutch lever 6.4 through pin 6.1 connected to the brake handle, causing the disengagement of the male and female portions of the low rpm as well as the high rpm clutches from their respective counterparts.

That is when the wire lines 6.31 and 6.41 which are attached to the outer race of the thrust bearing 15.27 and 16.27 are pulled by the clutch wire 6.8, the clutch control links 15.28 and 16.28 disengage the low and high rpm clutches from the hub-attached low rpm male clutch and the powerwheel attached high rpm clutches 12.21, 12.22, respectively.

The clutch wire line 6.8 which is tied on the clutch disengaging lever 6.4 (FIGS. 6a,6b) is mounted at its lower end around a pulley or clutch line wheel 42 which is keyed on a rod 41. The rod 41 extends through the hollow main axle rotatably mounted therein and is installed after a wheel enclosure base 42.1 is threaded on the corresponding end of the axle 40, over which an outer enclosure 42.2 is fastened by a twist lock method, the pivot connection of which helps the rod 41 to rotate concentrically upon pulling or release of the wire 6.8. The wire 6.8 extends through the enclosure 42.2 via an opening 42.3. A spring 42.4 is provided between the enclosure 42.2 and the wheel 42, maintaining the closure in a secure permanent position in abutment with the flange of the base 42.1.

The main axle 40 is formed with a central longitudinal opening 40.3 which is formed with a pivot recess 40.4, in which one end of the rotatable clutch control rod 41 is rotatably mounted. The other end of the rotatable rod is rotatably mounted on a projection extending from the outer enclosure 42.2. The main axle is formed with a plurality of openings 40.6 communicating with the longitudinal opening 40.3. Adjacent the openings 40.6, a pivot slide 41.1 is mounted on the control rod 41. A wire line worm is keyed to rotate with the rod 41, but free to slide back and forth as a plurality of wire lines 6.31 and 6.41 are wound therearound, when the other end of the rod which is pivoted via the pivot recess 41.3 on the projection of the enclosure 42.2, rotates by actuation of the clutch line wheel 42 by pulling on the clutch wire 6.8.

The clutch control wire lines 6.31 (as indicated with arrows pointing to the left on the drawing) have their end tips attached to the outer perimeter of the thrust type clutch control bearing 15.27, for example by snap locking or the like. These clutch control wires 6.31 also pass through radial access slots 39.7 in a stationary gear 39, the latter being mounted stationarily on the main axle 40 by means of a key slot disposed in a key 40.2. Likewise clutch control wire lines 6.41 are directed as indicated by the arrows pointing to the right in FIG. 5 with their ends or tips attached to the outer perimeter in the slots of the clutch control bearing 16.27, likewise passing through radial access slots 39.8 which are formed in the stationary gear 39. Since the clutch control bearings 15.27 and 16.27 are secured to the corresponding low rpm clutch members 15.11 and 16.11, respectively, via the clutch control links 15.28 and 16.28, the latter being secured to the clutch members and to the inner periphery of the respective clutch control bearings, accordingly when the wires 6.31 and 6.41 are wound on the wire line worm, then these wires pull the clutch control bearings as well as the associated female low rpm clutches 15.11 and 16.11 apart from their male counterparts 15.22 and 16.22, thereby disengaging the low rpm clutches 15.11 and 16.11.

The clutch races 15.12 and 16.12 of the low rpm clutch members 15.11 and 16.11 when displaced inwardly by coiling up the wires 6.31 and 6.41, as well as disengaging the low rpm clutches, push the moveable members 12.23, 12.24 of the high rpm clutches via the thrust bearing balls 15.26 and 16.26, respectively, against the clutch races 15.12 and 16.12, respectively, of the clutch members. In this manner the high rpm clutches disengage from the clutch attachments 12.21 and 12.22 on the powerwheel covers. That is the disengagement of both the low rpm clutches and the high rpm clutches takes place simultaneously compressing the undulating clutch spring 12.35, 12.45 by action of the wires 6.8 and 6.31, 6.41.

The low rpm clutch members 15.11 and 16.11 are displaced out of engagement from the clutch attachments 15.22, 16.22 on the hubs by the axial sliding of these clutch members in guides 15.9, 16.9 of gear holding plates 15, 16. Likewise the simultaneous axial movement of high rpm clutch members 12.23, 12.24 displace out of engagement clutch attachments 12.21, 12.22, forcing the entire gearing mechanism to stop rotating as the powerwheel 12 continues to gyrate freely on the powercycle hubs, as the powercycle independently may keep on running, slow down or stop at the driver's discretion.

Figures 2A, 7A:
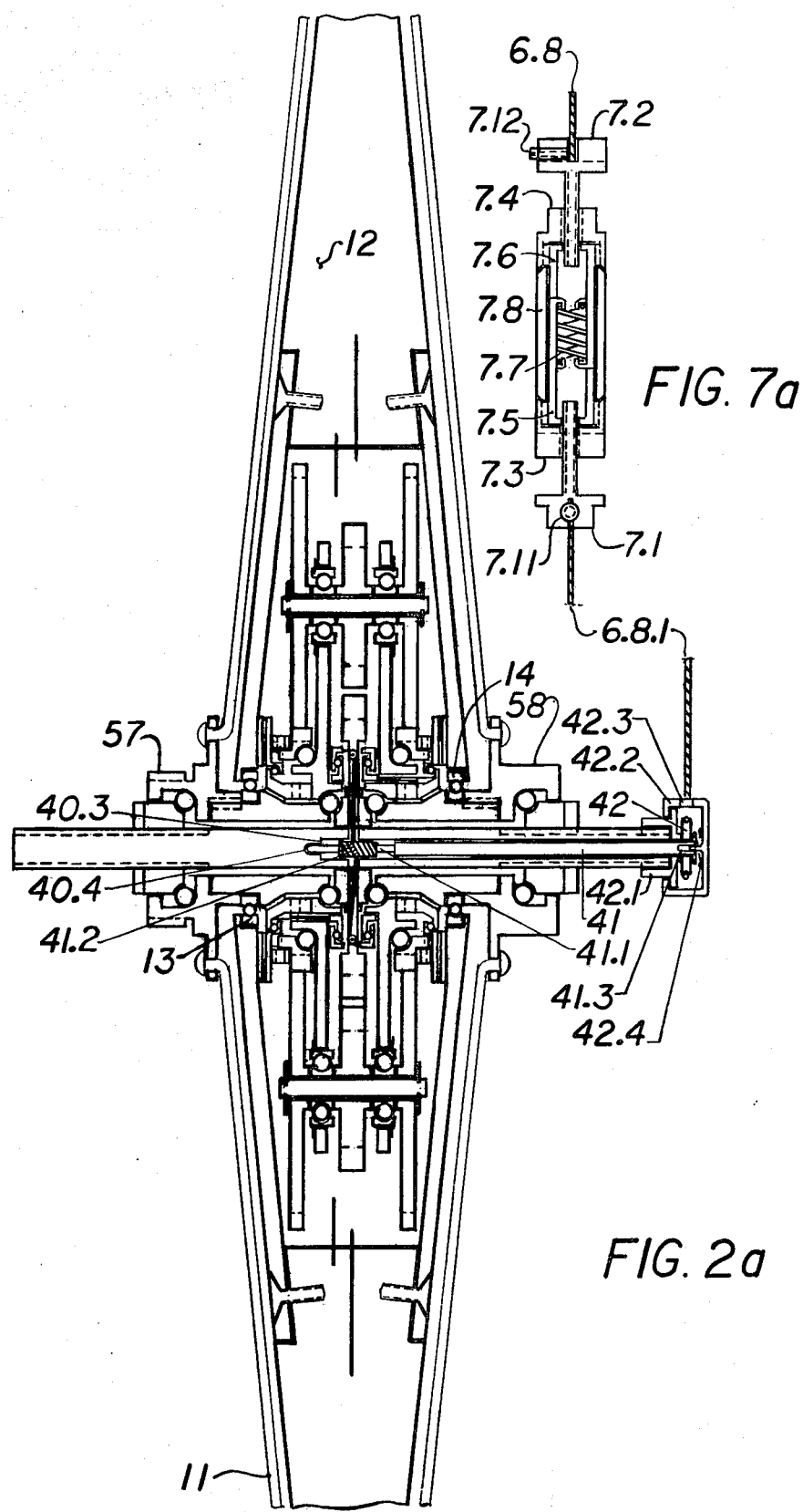
FIG. 2a is an enlarged view of FIG. 2 with the gear mechanism but, showing the powerwheel-flywheel partly broken away.
FIG. 7a is a cross-sectional view of the slack reducer assembled as when serving its function.
Figure 5:
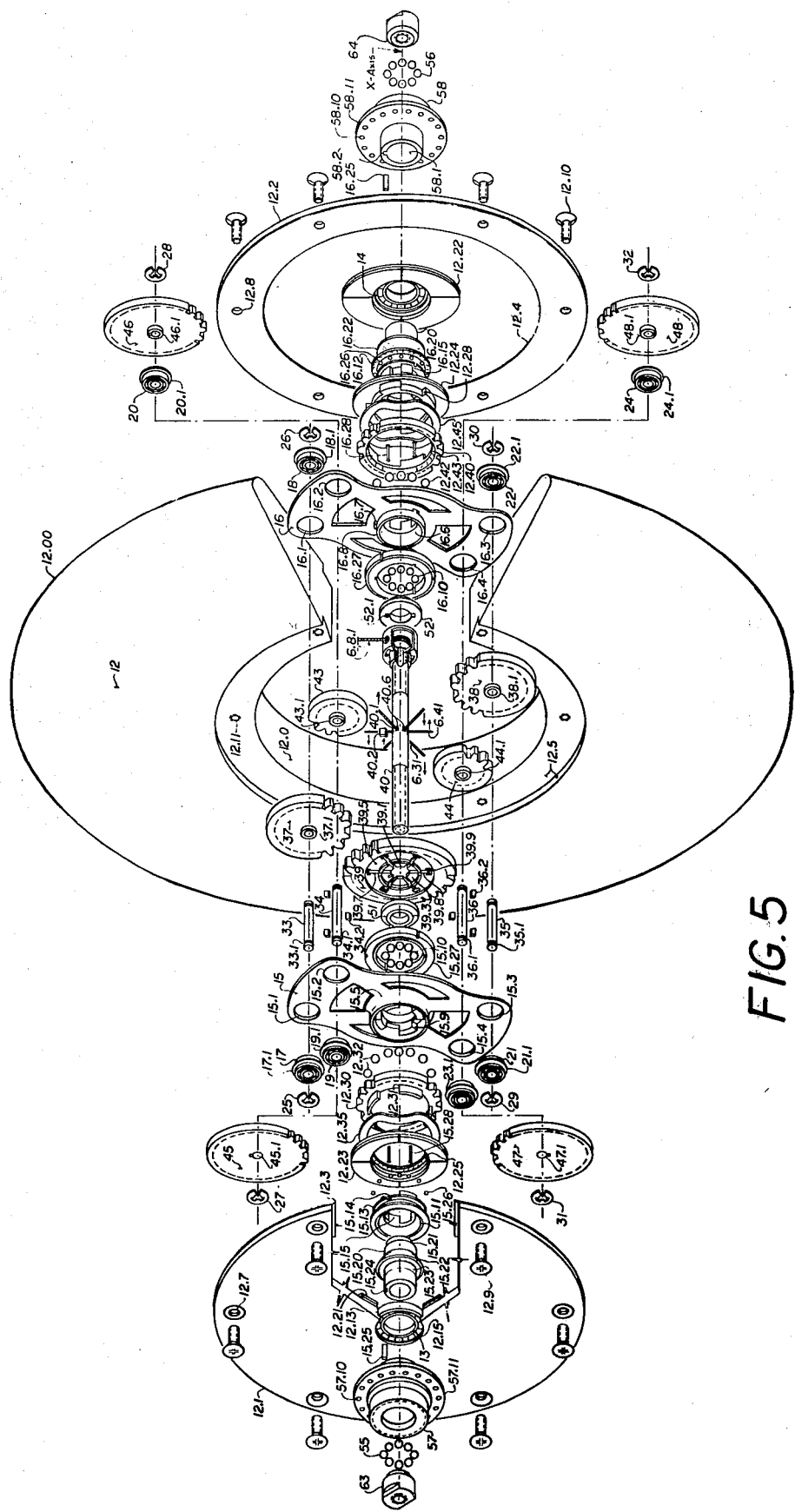
FIG. 5 is an exploded view of the powerwheel system, together with the axle and the spoke supporting hubs of the powercycle, but without the spokes and the outer rim and tire assembly of the powercycle, and with one of the covers being partly broken away.

Although FIG. 5 shows the clutch control bearings as one member, it may be seen from FIG. 2a that these members are each actually formed of two L-shaped members with bearing balls, therebetween.

The stationary main axle is threaded for securing the powerwheel and powercycle to and under the frame or chassis of the vehicle. The stationary gear 39 is stationarily mounted on the axle 40 and is formed with a central aperture 39.1 keyed to slip fit over the central axle 40 and is provided with peripheral teeth which engage in rolling contact with slave gears 37, 38. The slave gears 37 and 38 are rotatably inserted through the relative to the pivot rods 33 and 35, respectively. Planetary gears 43 and 44 are jointly rotatably mounted on the pivot rods 34 and 36, respectively, via keys 34.2 and 36.2 and are provided with peripheral gear teeth which mesh in engagement with the peripheral gear teeth of the slave gears 37 and 38, respectively. The planetary gears are provided with keyed hubs 43.1 and 44.1, respectively, which are keyed to the corresponding rods on both sides as may be required, whereby the slave gears are pivotally mounted with respect to their pivot rods without being keyed thereto. These slave gears receive torsional power from the stationary power gear 39 when the gear holding plates 15 and 16 are rotated by the low rpm clutch. In this manner the pivot axles revolve around the main axle along with the rotating plates 15 and 16, causing the slave gears 37 and 38 to rotate by rolling gearing engagement on the peripheral teeth of the stationary power gear 39. In turn the rotation of the slave gears 37 and 38 cause the planetary gears 43 and 44 to turn (at a predetermined gear transmission ratio), which in turn causes the pivot axles 33 and 36 to rotate. Power transfer gears 45, 46, 47, 48 having keyed hubs 45.1, 46.1, 47.1, 48.1 which are keyed to the pivot rods 34 and 36, likewise are rotated. These power transfer gears have peripheral teeth which engage with the peripheral teeth of the high rpm gear components 12.30, 12.40 (the latter constitute fast flywheel gears engaging to clutch components 12.23, 12.24).

That is when both the high rpm and low rpm clutches are engaged, the entire power transmitting mechanism assembly between and operatively connected to the low and high rpm clutches, causes the powerwheel 12 to rotate in the same direction as the rotation of the hubs 57, 58 and in the same direction as the rotation of the powercycle wheel. This, provides behefits of reduced friction in the bearings 13, 14 and the associated bearing balls and races, when the clutches are engaged the rotation of the plates 15, 16 causes the stepped up rotation of the fast flywheel gears 12.30, 12.40 via the planetary gearing system and likewise causing the powerwheel covers and the entire powerwheel to rotate therewith, the rotation of the plates 15, 16 being effected via hubs 57, 58, the low rpm gear clutches and via the interengaging guides 15.15, 16.15 thereof and 15.9, 16.9 of plates 15 and 16. When the clutches are disengaged after the powerwheel is rotating, the high rpm clutches 12.23, 12.24, the low rpm clutch parts 15.11, 16.11 and associated gear plates and gears completely disengaged come to a halt, but powerwheel-flywheel 12 continues to gyrate independently from the powercycle hubs 57, 58, which gyration translates into stored energy, whether the powercycle is moving or is stopped.

The keys 34.2 and 36.2 are provided for the planetary gears and keys for the power transmitting gears to key them rotatably jointly together with the corresponding pivot rods 34 and 36, respectively.

Slotted apertures 51.1 and 52.1 slip fit over the central axle 40 and its back slot is keyed onto the key 40.2 which is resting in key slot 40.1 and stationarily keyed in slot of key 39.

FIG. 3 is a cross-section of the powerwheel in a plane perpendicular to the cross-section of FIG. 2, viewing the ball bearing race 15.6 in the gear holding plate 15, around the powercycle axle 40 within the hollow center of the powerwheel 12. The arc length which the powercycle travels is represented by the short arcuate directional arrow at the bottom, closer to the rim perimeter, in comparison with the longer arcuate directional arrow representing the arc length which the powerwheel travels. Translating the arc lengths into revolutions per minutes (RPM) demonstrates that for every revolution of the powercycle, with the clutches engaged, the powerwheel gyrates n-times faster, the actual value for n depending on the gear ratios and other design criteria, adding torsional power to the powercycle.

FIG. 4 is a cross-section of the powerwheel in a plane perpendicular to the section of FIG. 2, but 180 degrees opposite to that of FIG. 3, viewing the ball bearing race 51 around the axle 40, the back of which rests in the seat 39.3, of the axial stationary gear, (similarly with bearing race 52 resting in seat 39.4 on the other side of axial stationary gear) transmitting power to the two slave gears 37, 38, respectively, and the two orbiting planetary gears 43, 44, which in turn transfer torsional power to the four power transmitting gears 45, 46, 47, 48, which engage with the powerwheel gears 12.30, 12.40.

The stationary power gear 39 is formed with recesses 39.5 and 39.6 on each side in which the clutch control bearings 15.27 and 16.27 move axially, as well with radial access slots and roller recesses 39.7 and 39.8 for the wire lines 6.31 and 6.41, respectively. Pivoted concave rollers 39.9 are disposed at the radially outermost portions of the access slots 39.7 and 39.8 about which the wire lines 6.31 and 6.41, respectively, pass and turn from the radial direction into the axial directions, respectively.

It is noted that the high rpm clutch springs 12.35 and 12.45 bias the displaceable high rpm clutch member 12.23 and 12.24 in the direction toward engagement with the clutch attachments 12.21 and 12.22, with the powerwheel gear component 12.30 and 12.40 being axially immoveable, the springs 12.35 and 12.45 being supported thereagainst.

Once the powerwheel is set into gyration of rotation by means of engagement of the clutches and motion of the powercycle or vehicle wheel, thereafter upon release of the clutches by actuation of the clutch of FIG. 6 and thereby pulling the wire 6.8, the powerwheel continues to turn, although disconnected from the clutches and gearing mechanism of the plates 15, 16, and the gear members 37, 38, 43, 44 and 45–48. This powerwheel, which constitutes a flywheel of continuously stored energy, during its gyration, can be used thereafter advantageously when desired at the proper moment, for example while the powercycle is stopped, to maintain the powercycle in its upright position without the operator having to put his or her feet on the ground. Thereafter to start the powercycle in motion, the driver can engage the clutches whereupon the powerwheel is then connected up through the internal gearing assembly to the powercycle hubs 57, 58, whereby the energy in the rotating flywheel is then transferred to the vehicle wheel to aid the initial starting and acceleration. Also during stopping of the bicycle, although the powerwheel is gyrating, additional braking energy of the bicycle wheel is not necessary to overcome the powerwheel torque, since by disengaging the clutches the powerwheel is disconnected from the bicycle wheel and conventional bicycle brake power is sufficient to stop the powercycle wheel using normal energy therefor. The gyrating powerwheel then can be used as a source of energy as above-mentioned when desireable or startup.

Figure 6A:
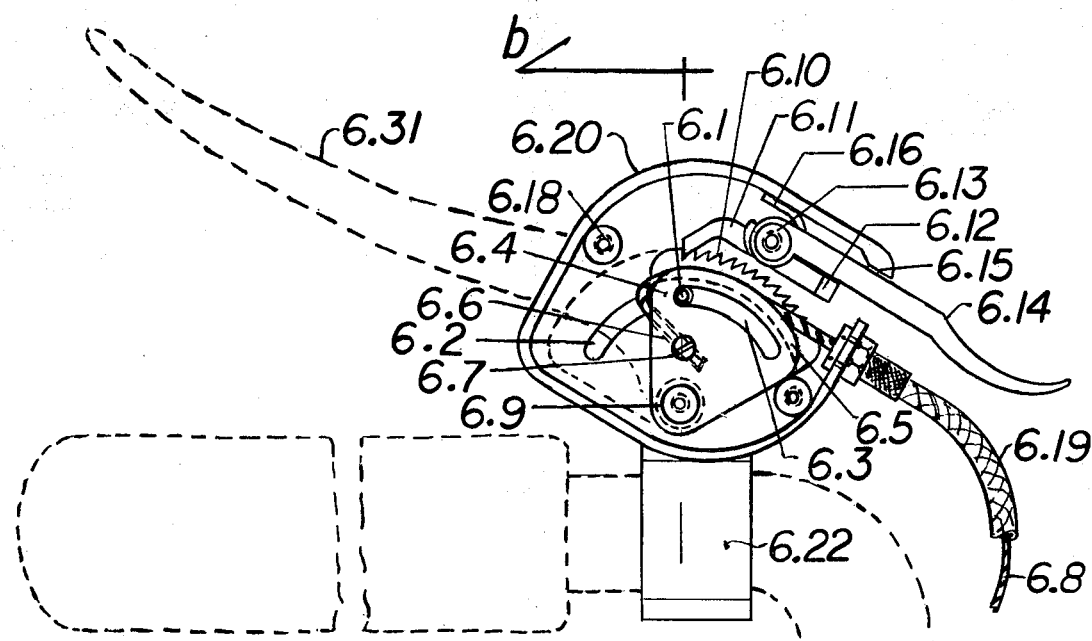
FIG. 6a is a schematic elevation view of the clutch control handle mounted on the same base frame as the brake handle, the conventional structure being illustrated in dashed lines and taken along the lines a—a of FIG. 6b.
Figure 6B:
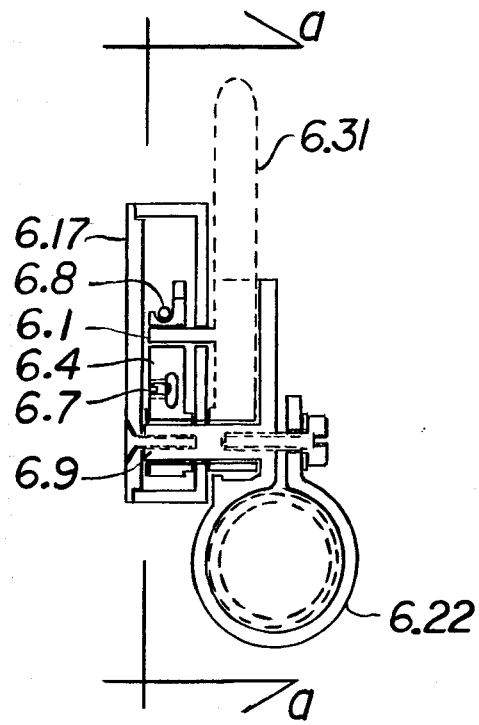

Referring now to FIGS. 6a and 6b the clutch control enclosure 6.20, in accordance with the invention is conveniently mounted on the same base frame as the conventional brake handle and is designed to be operated by a braking movement of the brake handle 6.31. The handle 6.31 is mounted on a conventional bracket 6.22 for the brake (as illustrated). The hand brake handle 6.31 is pivoted on the bracket at pivot point 6.9 as conventional. A clutch control cover 6.17 having holes aligned with screw holes 6.18 is fastened by screws through the screw holes. The enclosure 6.20 is formed with an arc-shaped aperture concentric relative to the pivot 6.9. The brake handle which is located on the back side of the enclosure 6.20 is formed with a clutch control pin rigidly attached thereon and extending through the arc-shaped aperture 6.2 of the enclosure as well as through another arc-shaped aperture 6.3 of a segment-shaped clutch disengaging lever 6.4 which is also pivotally mounted at pivot point 6.9 via the same screw which pivotally mounts the brake handle 6.31. The arcuate slot 6.3 likewise has a concentric radius relative to the pivot point 6.9. The clutch wire line 6.8 extends through a clutch line shield 6.19 which is connected to the enclosure 6.20 and passes through an arcuate-shaped clutch line recess 6.5 which is formed in the clutch disengaging lever 6.4, and the end of the wire 6.8 extends through a line hole 6.6 which is formed in the lever 6.4. A line retainer screw 6.7 passes through a cross hole formed in the lever 6.4 and secures the line 6.8 at its end to the lever 6.4. The outer arc periphery of the clutch disengaging lever is formed with ratchet teeth pointed in a direction away from the brake handle 6.31. A retainer pin or the like is pivotally mounted at pivot point 6.13 and spring biased by a retaining pin spring 6.16 which engages the lever and is supported against the enclosure 6.20, thereby biasing the free end of the retaining pin 6.11 into locking engagement with the ratchet teeth. A clutch engaging and release handle 6.14 is likewise pivoted in common with the pivot point 6.13 of the retaining pin 6.11, the clutch engaging handle 6.14 extending through an opening 6.15 on the side of the enclosure 6.20 to an arbitrary direction shown on the drawing.

(Instead of ratchet teeth 6.10 on the outer arc-shaped surface 6.10 of the clutch disengaging lever, one can use a bearing ball retaining pin and locking mechanism). The pin extension 6.12 is provided abutting the clutch engaging handle 6.14 so that when the clutch engaging handle 6.14 is pressed downwardly against the biasing of the pin 6.12, the opposite end of the retaining pin 6.11 is lifted from the ratchet teeth, whereby the clutch disengaging lever 6.4 may rotate back to release the clutch wire line, whereby the wires 6.31 and 6.41 (FIG. 2a) are unwound from the wire line worm 41.2 as the biasing of the springs 12.35 and 12.45 pushes the high rpm clutch 12.23 and 12.24 outwardly in turn moving the high rpm clutches into engagement with the clutch attachments 12.21 and 12.22 on the powerwheel cover as well as pushing the low rpm clutch members 15.11 and 16.11 into engagement via the conical clutch engaging portions 15.22 and 16.22, the displacement being transmitted via the ball bearings 15.26 and 16.26, respectively, via the races 12.25, 12.26 on the high rpm clutch and the clutch races 15.12 and 16.12 on the low rpm clutch. To release both the high rpm and low rpm clutches, which occurs simultaneously, the operator merely presses down on the brake handle 6.31 when braking of the bicycle is desired. In addition to causing the normal brake actuation on the bicycle wheel, the pin 6.1 now travels through the arcuate recess 6.2 in the enclosure 6.20 thereby moving the clutch disengaging lever 6.4 with it about the pivot point 6.9 and causing the spring biased retaining pin 6.11 to ride resiliently over the ratcheting ratchet teeth 6.11 the lever 6.4 pulls line 6.8 to the point of clutch disconnection according to FIGS. 6a, 6b, (also see FIG. 1 number 6(a,b)). Upon releasing the brake handle 6.31 the retaining pin 6.11 catches in the ratchet teeth and prevents the lever 6.4 from reversing rotation into its normal position for extension of the clutch wire line 6.8. The clutch wire line 6.8 is now in its pulled-up position, whereby the wheel 42 is rotated to cause the wires 6.31 and 6.41 to wind up on the worm 41.2 whereby as previously described, the low rpm clutch members 15.22 and 16.22 are disengaged and displaced inwardly relative to one another likewise displacing the high rpm clutches via the clutch races 15.12 and 16.12 and 12.25 and 12.26, respectively, via bearing balls 15.26 and 16.26, respectively, whereby all clutches are disengaged and the powerwheel, if gyrating continues to gyrate by its inertia, disconnected from the internal power transmitting assembly, that is the elements and gearing connected between the high rpm and low rpm clutches inside the powerwheel are now in a virtual still inertia on main axle 40.

At the desired moment, the clutches again may be brought into engagement by pressing down on the clutch engaging handle 6.14 whereby the clutch disengaging lever is released by the pulling biasing on the wire 6.8 due to the action of the spring 12.35 and 12.45 via the elements 12.23, 12.24, the races and the bearing balls 15.26, 16.26, the control links 15.28, 16.28, the wires 6.31 and 6.41 and the rod 41. A clutch control enclosure cover 6.17 is held by screws in screw holes 6.18.

Figure 7B:
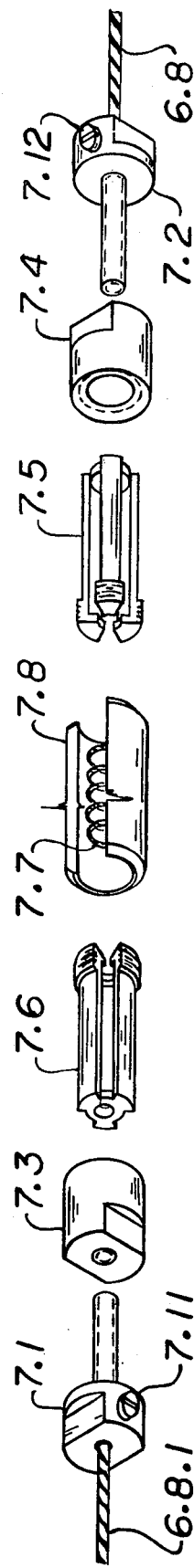

Referring now again to the drawings and more particularly to FIGS. 7a and 7b, a slack reducer of the clutch control line is also provided to adjust line tension as required. The end of the clutch wire 6.8 closest to the top is connected to an upper threaded bolt extension having a head in which the clutch control line is secured by a radial hole via a screw 7.12 or other means. Likewise a bottom threaded bolt extension 7.1 is provided having a head capable of receiving the bottom portion of the clutch control line 6.8.1 likewise held by a screw 7.11 on the bolt extension 7.1. The threaded bolt extensions are screwed into opposite symmetrical caps 7.3 and 7.4 having engaging counterpart female threads for the bolt extension. The threaded bolts of the bolt extension 7.1 and 7.2 have an opposite threading relative to one another. Spring compressors 7.5 and 7.6 engage in caps 7.3 and 7.4. The spring compressors in exploded view in FIG. 7b are each formed of preferably three arcuately spaced longitudinal segments having outer threadings on one of their ends engaging with the caps, respectively, and with the segments of the opposite spring compressors alternatingly disposed between the segments of the other spring compressor. A spring 7.7 which is designed to withstand the combined pressure of the clutch spring 12.35 and 12.45 and frictional drag of the clutch and its auxiliary system, but which yields to greater pulling forces exerted by the clutch disengaging lever 6.4 on the line 6.8, permits the brake handle 6.31 to move without restraint, maximizing the desired effect of both controls. That is the spring is sufficiently strong to overcome the clutch springs. If the clutch wire 6.8 is too slack or too tight, merely by rotating the caps 7.3 and 7.4 simultaneously one causes the threaded bolt extension 7.1 and 7.2 to either approach one another or be moved further apart, whereby the slack and tension of the control line 6.8 can be optimized. A protective cover sleeve 7.8 for protecting the spring compressors from moisture may be provided.

While I have disclosed an embodiment of the present invention, it is to be understood that this embodiment is given by example only and not in a limiting sense.

I claim:
1. A powercycle comprising
a vehicle wheel having wheel supports,
a flywheel rotatably mounted between the wheel supports inside the vehicle wheel, said flywheel defining sides,
clutch means for releasably connecting and disconnecting, selectively, said flywheel to and from said vehicle wheel, said flywheel being rotatable relative to said vehicle wheel, said clutch means is disposed within the confines of said sides whereby balance is promoted.

2. The powercycle as set forth in claim 1, further comprising a stationary axle, said wheel supports are operatively rotatably mounted on said stationary axle, said clutch means includes, a stationary gear secured on a center of said stationary axle, and a rotating gear means engaging said stationary gear, a central bearing means comprises, central stationary races connected to said stationary gear each forming an inner part of a three part race, gear holding plates each operatively rotatably mounted relative to said stationary axle and forming an overlapping part of said three part race, split hubs rotatably mounted on said stationary axle having hub sections each forming an outer part of said three part race, said central bearing means includes bearing balls in said three part race operatively disposed contacting said parts of said three part race.

3. The powercycle as set forth in claim 2, wherein said clutch means further includes transmitting means for rotatably connecting said flywheel to said vehicle wheel and to said stationary gear, said vehicle wheel is operatively mounted on said split hubs via said wheel supports for joint rotation therewith, means for mounting said flywheel rotatably on and relative to said split hubs for rotation of said flywheel in the same direction of rotation as that of said wheel.

4. The powercycle as set forth in claim 3, wherein said clutch means include low rpm clutches and high rpm clutches, said transmitting means comprises gears for rotatably connecting said flywheel to said vehicle wheel in a predetermined ratio, said gears being connected to and between said low rpm clutches and said high rpm clutches, said low rpm clutches and said high rpm clutches are mounted for simultaneous disengagement and engagement, respectively, said low rpm clutches are connected to said split hubs and said high rpm clutches are connected to said flywheel.

5. The powercycle as set forth in claim 4, further comprising thrust bearing means operatively disposed between said low rpm clutches and said high rpm clutches for relative rotation of said high and low rpm clutches and joint axial displacement, said low rpm clutches and said high rpm clutches each respectively including members thereof for engaging and disengaging said clutches respectively upon relative axial movement.

6. The powercycle as set forth in claim 5, wherein said members of said low rpm clutches include male and female members having frustoconical clutch engaging surfaces respectively, one of said male and female members being axially displaceably mounted and the other member being stationarily mounted.

7. The powercycle as set forth in claim 6, further comprising said covers connected to said flywheel and including clutch engaging attachments, said clutch engaging attachments constitute means for operatively jointly rotatably engaging with said high rpm clutch, said high rpm clutch is axially displaceable into and out of engagement with said clutch engaging attachments.

8. The powercycle as set forth in claim 7, wherein said transmitting means includes said gears constituting a fast flywheel gear rotatably joined to said high rpm clutch, yet axially displaceable relative to said high rpm clutch, said gear holding plates rotatably joined to said female member of said low rpm clutch yet axially moveable relative thereto, said gears further including planetary gear and power gear means operatively connected to said fast flywheel gear for stepping up the transmission rotational speed ratio from said female member to said flywheel gear.

9. The powercycle as set forth in claim 8, wherein said planetary gear and power gear means includes, a plurality of pivot rods rotatably connected to said gear holding plates, slave gears rotatably mounted on said pivot rods respectively and engaging said stationary gear in rolling contact, planetary gears secured to said pivot rods respectively and meshing with said slave gears, respectively, power transfer gears secured to said pivot rods, respectively and meshing with said fast flywheel gear.

10. The powercycle as set forth in claim 9, wherein said clutch means includes, a plurality of wire means for operatively displacing said high and low rpm clutches axially, a clutch rod mounted inside said axle, said wire means includes wires windably disposed in said clutch rod, extending through said stationary gear and operatively connected to said female members of said low rpm clutches, a pulley wheel mounted in said clutch rod, said wire means is rotatably connected on said pulley wheel, a brake handle, clutch actuation means operatively connecting the brake handle and said pulley wheel for actuation of said wire means simultaneously therewith.

11. The powercycle as set forth in claim 10, further including thrust bearings, said wires connect onto said thrust bearings, links connect said thrust bearings to said female members.

12. The powercycle as set forth in claim 10, wherein said wire means is formed in two parts, a slack reducer means connected between said two parts of said wire means between said clutch actuation means and said pulley wheel.

13. The powercycle as set forth in claim 10, further including spring means disposed between said flywheel gear and said high rpm clutch for biasing the latter and therewith said low rpm clutches into operative engagement with each other respectively.

14. The powercycle as set forth in claim 10, in cooperation with a brake handle, wherein said clutch actuation means includes,
a clutch disengaging lever pivotally mounted jointly with the brake handle about a pivot point and formed with a first arcuate slot concentric to said pivot point and with peripheral ratchet teeth,
an enclosure having a second arcuate slot concentric to said pivot point,
a clutch control pin secured to the brake handle and extending through said first and second arcuate slots,
a spring biased clutch engaging handle having detent means for engaging in said ratchet teeth, and
said wire means is connected to said clutch disengaging lever.

15. The powercycle as set forth in claim 12, wherein said slack reducer means comprises two symmetrical portions each comprising,
a threaded bolt having a head secured to one of said parts of said wire means,
a cap having a threaded opening adjustably receiving said threaded bolt therein,
a spring compressor secured to said cap and formed with longitudinal extensions circumferentially spaced apart and having flanged ends,
a compression spring disposed between said ends of both of said spring compressors, both of said spring compressors being disposed in inverted symmetrical position relative to each other with said extensions thereof respectively interengaging with each other, and
both of said threaded bolts are oppositely threaded.

* * * * *